United States Patent [19]
Hesse

[11] 3,881,562
[45] May 6, 1975

[54] WEIGHING AND MEASURING APPARATUS FOR FODDER AND SIMILARLY COURSE MATERIALS

[76] Inventor: Myron C. Hesse, 2415 North 92nd St. (Apt. No. 4), Omaha, Nebr. 68114

[22] Filed: Sept. 20, 1974

[21] Appl. No.: 507,750

[52] U.S. Cl. ............................................ 177/83
[51] Int. Cl. .................................... G01g 13/22
[58] Field of Search ............................ 177/83–88

[56] References Cited
UNITED STATES PATENTS

| | | | |
|---|---|---|---|
| 405,462 | 6/1889 | Busenbarrick | 177/86 |
| 412,076 | 10/1889 | Duffy | 177/86 |
| 572,504 | 12/1896 | Dennis | 177/86 |
| 2,041,629 | 5/1936 | Wicks | 177/86 |
| 2,342,053 | 2/1944 | Kinnebrew | 177/86 |
| 3,109,503 | 11/1963 | Recknor | 177/86 |

Primary Examiner—Stephen J. Tomsky
Assistant Examiner—Vit W. Miska
Attorney, Agent, or Firm—George R. Nimmer

[57] ABSTRACT

Disclosed are improvements for weighing and measuring apparatus of the chute and revolvable/vertically reciprocatable paddle-gate type, and especially adapted for weighing and measuring heavy batches of course agricultural crops such as fodders. The improvements include means for preventing wedging of the crop material between the revolvable paddle-gate, such as a rearwardly swinging upright door and a rearwardly flared underlying trough both at the chute rear-end. Also disclosed are improved stop-means for steading and then releasing the revolvable paddle-gate, the stop-means being vertically adjustable and including a frontal toggle portion to prevent reverse directional turning of the paddle-gate member.

10 Claims, 4 Drawing Figures

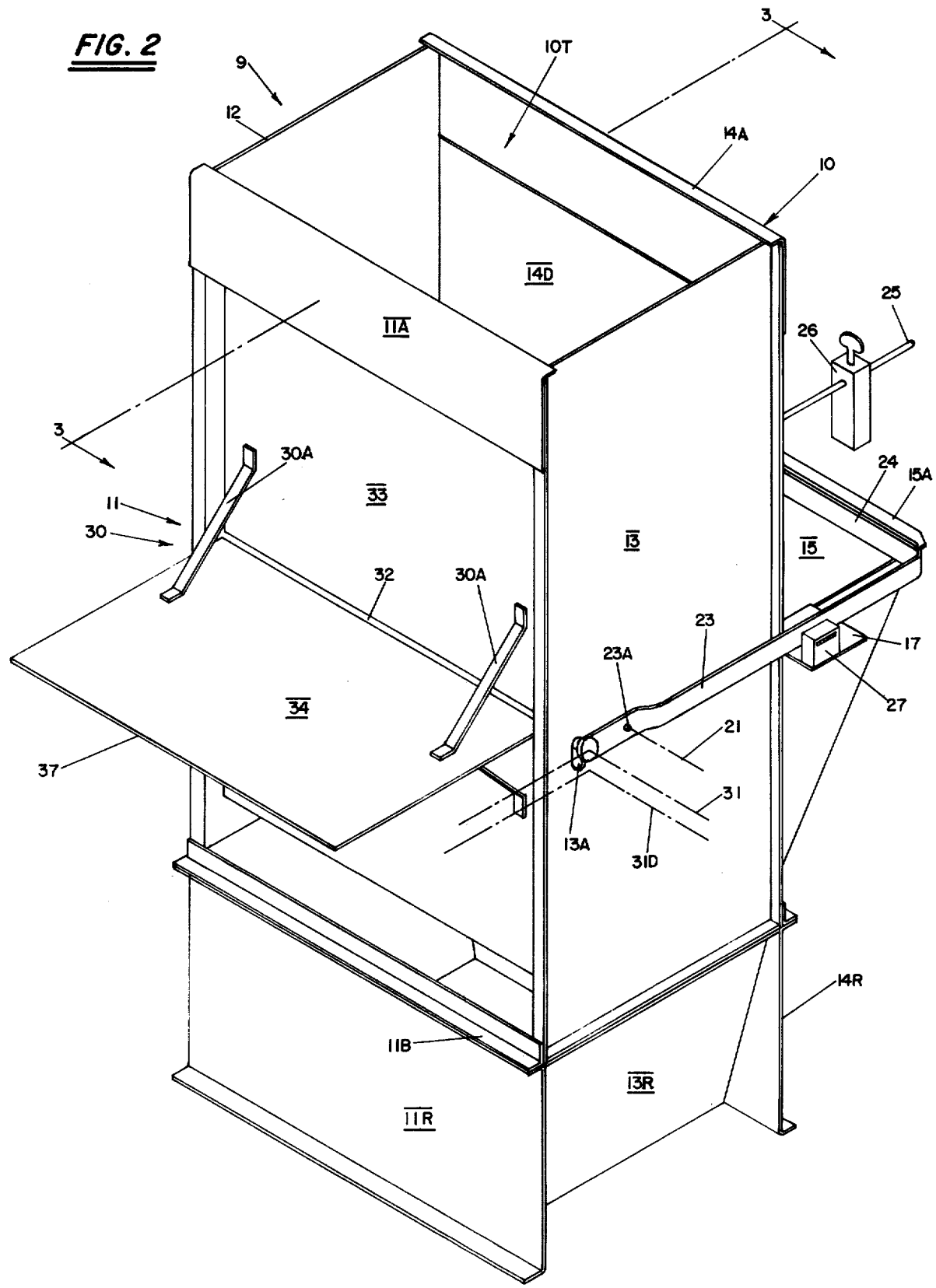

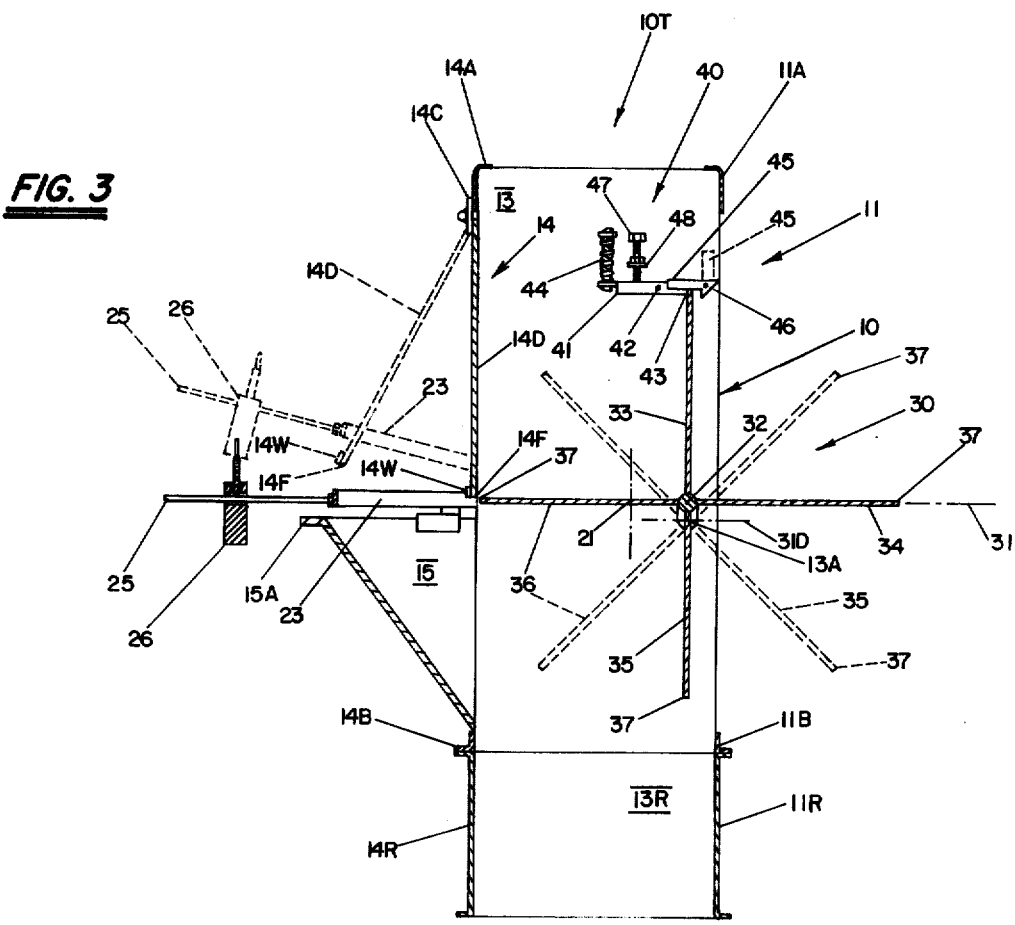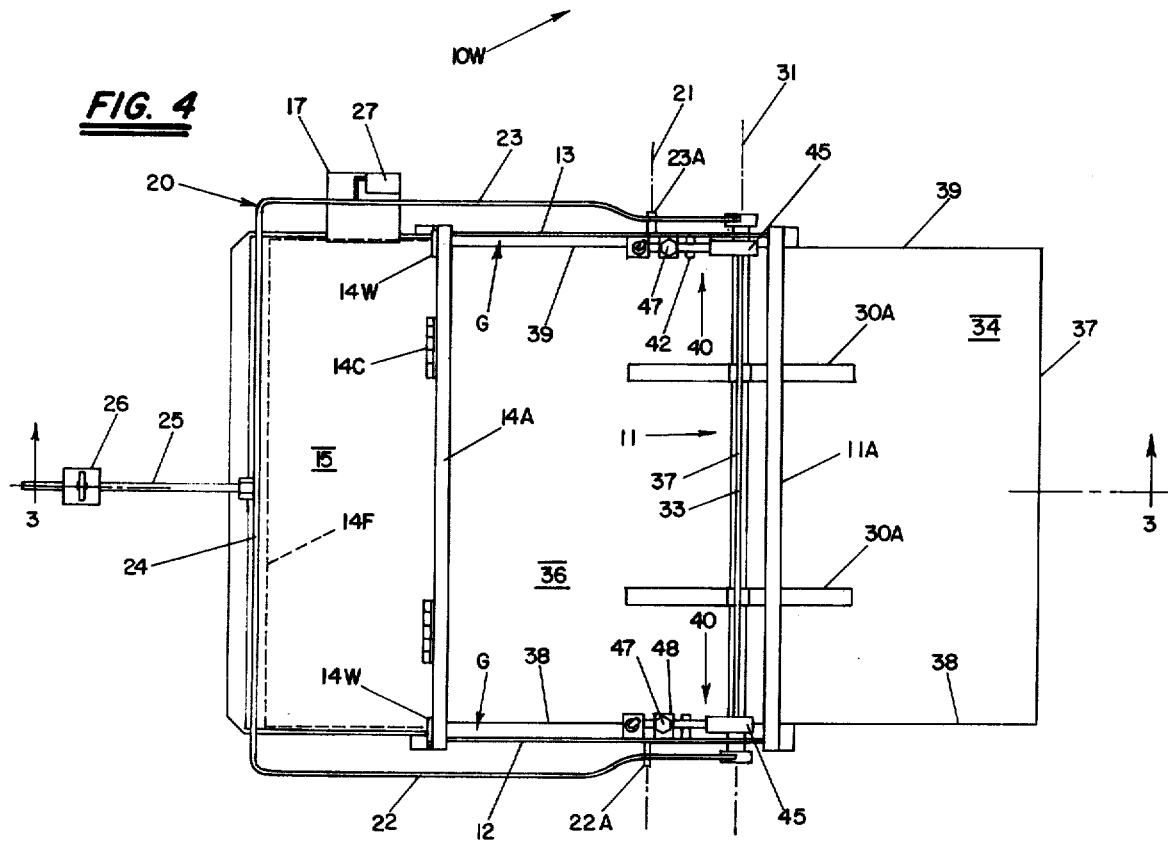

WEIGHING AND MEASURING APPARATUS FOR FODDER AND SIMILARLY COURSE MATERIALS

Weighing and measuring apparauts comprising a vertical chute internally equipped with a revolvable and vertically reciprocatable balanced paddle-gate are disclosed in U.S. Pat. Nos. 405,689(Applen—June 25, 1889) and 3,109,503(Recknor, et al—Nov. 5, 1963). Paddle-gate weighers are gravity-operated, and because no other external motive power is required, they are admirably adapted for use outdoors such as for agricultural purposes e.g. for weighing flowable crops such as grains. As exemplified by the Recknor patent, recent developments for the paddle-gate weighting art are mainly devoted to the especial problems attendant with freely-flowable solids such as grains. In face, paddle-gate weighing apparatuses have heretofore generally been considered grossly inadequate for the heavy batches of supercourse materials such as agricultural fodders and silage. In this vein, there is the wedging tendency which occurrs with course fodders between the revolvable paddle-gate and the chute and the misalignment of the heavily-laden vertically-reciprocatable paddle-gate with its upper station stopmeans. Nevertheless, prior art workers have recognized and coveted the general advantages of such gravity-operated weighers for course agricultural crops e.g. fodders and silage, provided said wedging and misalignment problems could be overcome.

It is accordingly the general object of the present invention to provide overcome the several disadvantages and deficiencies of prior art gravity-operated paddle-gate type weighers.

It is also among the objects of the present invention toprovide gravity-operated paddle-gate type weighers which are especially adaptable for weighing heavy batches of course agricultural crops such as fodders and silage.

It is another object to provide stop-means for the transverse-extremity of the uprighted paddles and which will both guard against reverse directional turning of the paddle-gate and compensate for misalignment of the paddle-gate axle relative to the chute.

It is further object to provide unusually voluminous and sturdy chutes appropriate to the weighing and measuring of hard-to-handle course materials such as agricultural fodders and silages.

With the above and other objects and advantages in view, which will become more apparent as this description proceeds, the novel concepts herein for weighing and measuring apparatuses of the gravity-powered paddle-gate type generally comprise a toggle type stopmeans of general applicability and comprising an elongate horizontal bar located at the chute upper internal portion and of selectably adjustable height including a toggle pivotably attached to the elongate bar forward part thereby preventing inimical reverse directional turning of the paddle-gate member during batch weighing, and for especial utility with fodders, silage, and the like, a voluminous sturdy chute a planar upright door closure along the chute rear-end upper portion whereby the door swings rearwardly and upwardly during paddle-gate ejection of a weighed batch, the chute further comprising a rearwardly flared trough spaced below the swinging door transversely extending horizontal lower-edge, and the trough converging toward the chute open bottom-end to direct a weighed ejected batch downwardly-forwardly theretoward.

In the drawing, wherein like characters refer to like parts in the several views, and in which:

FIG. 2 is a perspective view of the FIG. 1 embodiment as seen from the top, left, and rearward directions thereof.

FIG. 3 is a sectional elevational view taken along section line 3—3 of FIGS. 1 and 2.

FIG. 4 is a top plan view of the FIGS. 1-3 embodiments, but desireably having an additional said improved stopmeans.

Figure 1:
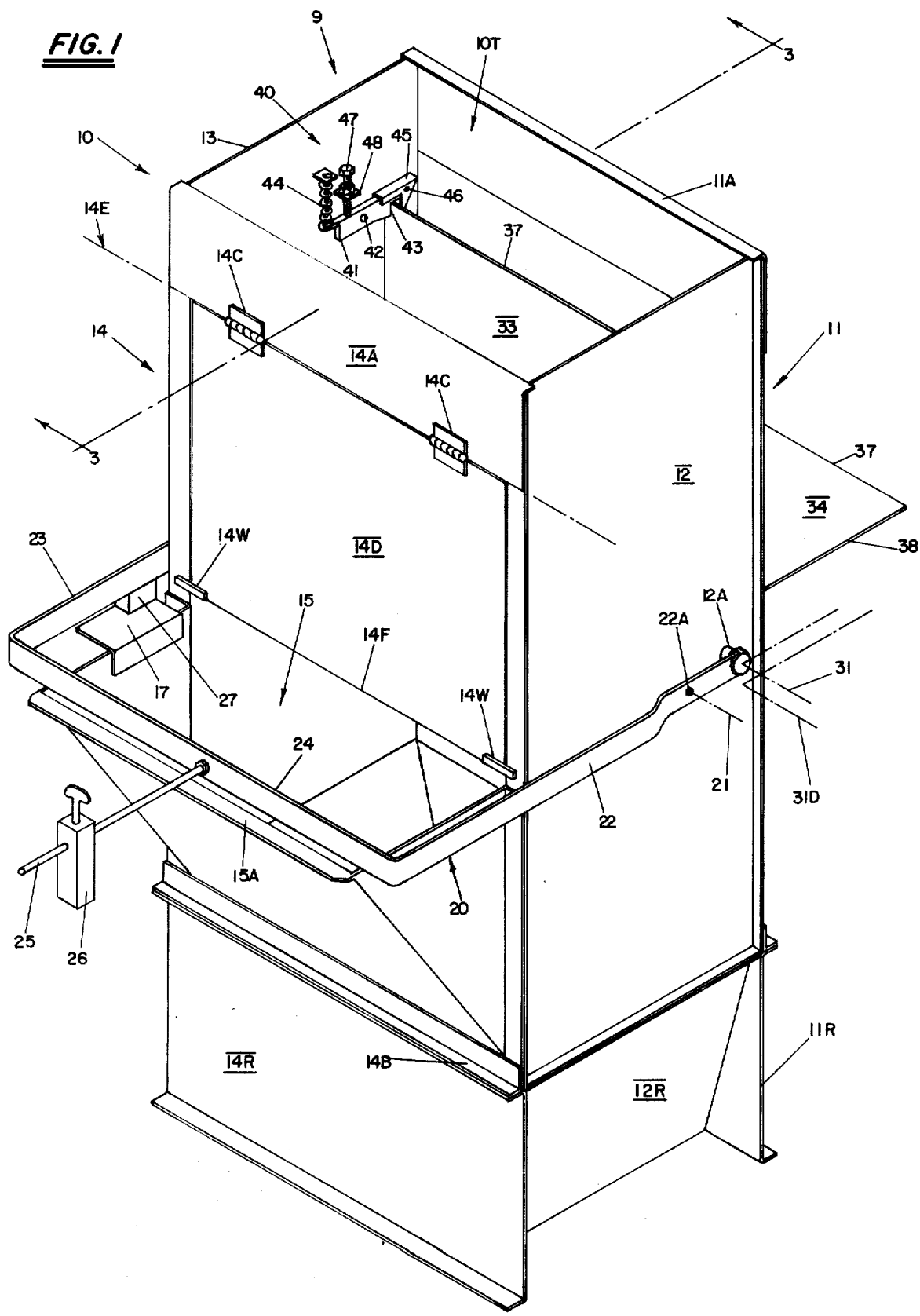
FIG. 1 is a perspective view of a preferred embodiment of the gravity-powered weighing and measuring apparatus of the present invention, as seen from the top, right, and frontal directions thereof.

The weighing and measuring apparatus concepts of the present invention are shown as embodiment 9 of FIGS. 1-3. A vertically extending lofty hollow chute 10 has an upright left-panel 12 and an upright right-panel 13 having a fixed transverese distance therebetween as herein established by the following four transversely extending rigid members respectively attached to panels 12 and 13: front-header 11A at common elevation with rear-header 14A, and front-spacer 11B at common elevation with rear-spacer 14B. Thus, chute 10 has an open upright front-end 11 disposed in elevation between members 11A and 11B to accomodate the moving paddles of a revolvable and vertically reciprocatable paddle-gate member (30). Also, chute 10 has an open top-end 10T to permit downward charging of the material to be weighed onto member 30 and an open bottom-end 10W located below spacers 11B and 14B for downward discharging of the weighed material. The chute open bottom-end 10W is defined by four mutually perpendicular interconnected relatively short risers all located below the level of spacers 11B and 14B and including: front-riser 11R, left-riser 12R, right-riser 13R, and rear-riser 14R.

For the chute rear-end 14 at the upper portion thereof is a planar upright door closure 14D having its upper part pivotal about a horizontal transversely extending door-axis 14E herein effected through a pair of hinges 14C attached between door 14D and rear-header 14A. Thus, as indicated in phantom line, door 14D commencing at its horizontal transversely extending lower-edge 14F pivotably swings rearwardly during paddle-gate (30) revolving ejection of a weighed material batch. There are stabilization means for maintaining swingable door 14D in a vertically upright closed condition during charging of a finite material batch onto the paddle-gate member (30), and such stabilization means might be provided by a relatively high mass for door 14D. For the chute rear-end 14 at the lower portion thereof is a rearwardly flared trough 15 having a transversely extending horizontal top-lip 15A as the trough top-rear extremity which is spaced a finite-gap below door lower-edge 14F and generously rearwardly of members 14A-14B. Trough 15 commencing at top-lip 15A converges downwardly and forwardly toward the chute open bottom-end 10W to direct a weighed batch theretoward after having been ejected by the revolving paddle-gate (30) and partially through said rearwardly swinging door 14D.

There is a generally horizontal U-shaped balancing tail 20 including transversely separated horizontal side arms 22 and 23 located externally along the left-panel 12 and right-panel 13, respectively. Balancing bail 20 also includes a transversely extending horizontal intervening bight portion 24 located externally of the chute rear-end 14 and herein in elevation between trough top-lip 15A and door lower-edge 14F. Intermediate portions of bail side-arms 22 and 23 are pivotably attached along a transversely extending horizontal bail-axis 21, as with pins 22A and 23A, to respective chute panels 12 and 13. There is a weighing beam member 25 extending rigidly horizontally of bail bight 24 and having a slidable weight 26 therealong to determine the batch weight for paddle-gate member 30. As will become apparent, the ejection of each weighed batch is accompanied by vertical movement of bail bight 24 and paddle-axle 32 arcuately about bail-axis 21. In this vein, bail bight 24 might be conventionally actuatably connected to a mechanical counter mechanism 27 mounted to a shelf 17 extending transversely of trough 15. Thus, counter device 27 is adapted to automatically record the number of batches weighed and ejectably discharged during a given time period.

Located within the chute (10) is a paddle-gate member 30 comprising a horizontal paddle-axle 32 lying transversely along paddle-axis 31 and comprising more than two (e.g. four) paddle members (33–36) respectively extending rigidly radially outwardly of paddle-axle 32. Herein, there are four rectangular planar paddles 33–36 each of identical dimensional size and rigidly paced at 90° angular increments about paddle-axle 32 and including inter-paddle braces 30A. The horizontal transverse remoteedge 37 of each paddle (33–36) is spaced a like radial dimension from the paddle-axle 32. The leftward (38) and the rightward (39) radial free-edges of the respective paddles 33–36 are spaced a finite-gap "G" inwardly from the chute left-panel 22 and right-panel 23, respectively. Paddles 33–35 can be seen in FIG. 1 through the chute open fron-end 11 through which paddles 33–36 are adapted to forwardly protrude. Paddle-axle 32 passes through vertically elongated slots 12A and 13A in left-panel 12 and right-panel 13, respectively, and is revolvably secured to the bail side arms 22 and 23 forwardly of transverse bail-axis 21. Thus, not only is paddle-gate member 30 revolvable about paddle-axis 31, it is also vertically reciprocatable in slots 12A and 13A as an arc with respect to bail-axis 31. As best seen in FIG. 1, paddle-gate member 30 is at its upward-station (i.e., paddle-axle 32 nearer the upper end of slots 12A and 13A) when empty of material to be weighed. But with progressive charging of material (e.g. silage) into the chute open top-end (10T), paddle-gate 30 and axle 32 move progressively down to a downward-station at the desired (e.g. via 26) batch weight wherein paddle-axle 32 is nearer the lower end of slots 12A and 13A.

As is taught by the prior art, there is necessary to have some kind of stop-means to prevent the paddle-gate member (e.g. 30) from revolving rearwardly (e.g. clockwise in FIG. 2) during its upward-station weighing, but which stop-means will release the paddle-gate to eject a a completely weighed load e.g. from one-quarter of the paddle-gate volume, toward the chute rear and lower (e.g. 10W) portions. As in the prior art, the stop-means might take the rudimentary form of a front-header (11A) precisely spaced away from the paddle-axis (32) a distance approximating the radial dimension (from paddle-axis 31 to paddle remote-end 37) when the paddle-gate is at material-free upward-station, the precise stop-means distance being greater than said radial dimension however when the predetermined (e.g. 26) loaded paddle-gate member is at its downward-station 31D. However, two noteworthy deficiencies are noted in prior art stop-means. First, heavier batch loads repeatedly charged into the paddle-gate member (30) will tend to change the elevational values of axes 31 and 31D, both relatively and absolutely, and this results in stop-means misalignment. Second, sometimes the revolvable paddle-gate member during upward-station charging tends to turn in the wrong angular direction (e.g. inimicably counterclockwise in FIG. 2). Especially severe would these problems loom for unusually large chutes (10) as necessitated for silages and fodders e.g. chute volumes exceeding 25,000 cubic inches such as about 62 inches tall, 20 inches front-to-rear, and 28 inches right-to-left.

The novel stop-means (e.g. embodiment 40) of the present invention for the successively uprighted paddles (33–36) is located within the chute upper portion (near 10T) at a distance from the paddle-axle (32) to the paddle transverse remote-end (37), and measured vertically upwardly from an elevation between axes 31 and 31D. The novel stop-means generally comprises an elongate bar of vertically adjustable fore-end height, the bar being substantially horizontal and parallel to a chute side-panel (e.g. 12, 13) and the bar fore-end serving as and abutment means for the paddle remote-end (37) to prevent paddle-gate turning rearwardly at its material charging upward-station (31) but not at its fully charged downward-station (31D). Moreover, there is a dog-like toggle upwardly pivotably associated with the elongate bar to momentarily admit the paddle transverse remote-end between it and the bar foreend. The toggle has a normal-station (solid line in FIG. 3) to stationarily confine the paddle and thus too the entire paddle-gate member (30) from revolving forwardly during chargeable weighing (e,g, at axis 31) of a material batch.

The preferred stop-means embodiment 40 of the present invention comprises an elongate horizontal bar 41 lying parallel to a chute side-panel (e.g. 12, 13), a medial portion of bar 41 being pivotably attached to the chute side-panel with a transversely extending horizontal pivot-pin 42. Upright helical spring means 44 suspendably attaches the bar rearward part to an inward extension of the chute side-panel. An adjusting screw 47 depends from the inward boss 48 of the chute side-panel, vertical screw 47 bearing as a gradual or progressive pressure-application means against bar 41 (between spring 44 and pivot-pin 42) to stably adjust the elevation of the bar critical fore-end 43. A dog-like toggle 45 is pivotably associated with bar 41 about a horizontal and transversely extending pivot-rod 46 located near bar fore-end 43. Toggle 45 has a size and shape to provide with respect to pivot-rod 46 a normal-station depending dog-like from bar 41 and slightly forwardly offset of fore-end 43 to stationarily confine the paddle (e.g. 33) and thus too the entire paddle-gate assembly from revolving in either angular direction (including inimicably forwardly) during chargeable weighing of a material batch. As can be seen in phantom line in FIG. 3, during ejection of a weighed batch rearwardly and a "fresh" paddle approaches the stop-means (40), toggle 45 pivots momentarily upwardly about pivot-rod 46 to allow the approaching paddle to abut bar fore-end 43 whereupon the toggle 45 confines the "fresh" paddle thereat. For unusually large volume chutes e.g. exceeding about 25,000 cubic inches, and appropriate to weighing and measuring fodder, silage, and similarly course material, two identical stop-means assemblies (40) are desireable and positioned along the respective chute side-panels 12 and 13.

Operation of the gravity-operated paddle-gate type weighing and measuring apparatus 9, although having been alluded to, might be summarized as follows. The paddle-gate member 30 is at its upward-station 31 in FIGS. 1–3 for chargeable weighing of material into chute top-end 10T so the material collects within the paddle-gate quadrant defined by paddles 33 and 36. Paddle 33 at its transverse remote-end 37 is confined between depending toggle 45 and bar fore-end 43 of stop-means 40 whereby paddle-gate member 30 cannot revolve in either angular direction about axis 31. Upon attainment of the prescribed 25–26 batch weight, the paddle-axis has descended to level 31D whereupon paddle 33 remote-end 37 is below bar fore-end 43 and paddle-gate 30 revolves rearwardly (counterclockwise in FIG. 4). As indicated in FIG. 4 phantom lines, the weighed batch is rearwardly ejected from said revolving quadrant (36-33) and at least partially through the rearwardly swinging door 14D into trough 15 and thence forwardly-downwardly of trough 15 for discharge at chute bottom-end 10W into an awaiting collector (not shown). Then, by virtue of the abutment-ears 14W, heavy door 14D regains vertical stabilization e.g. co-planar with rear-header 14A. Coincidentally, a "fresh" paddle 34 moves toward and becomes confined between toggle 45 and bar fore-end 43, paddle-gate upward-station 31 is resumed, and the apparatus becomes ready for another chargeable (10T) batch of weighable material e.g. fodder, etc. By virtue of paddle-gate gaps "G" at the chute side-panels 12 and 13, there is no problem with wedging of the weighed material to inimicably bind the paddle-gate member 30.

From the foregoing, the construction and operation of the weighing and measuring apparatus concepts of the present invention will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. A weighing and measuring apparatus especially adapted for heavy batches of fodder, silage, and similarly course material and comprising:

A. An upright chute having an open upright front-end to accommodate the paddles of a revolvable and vertically movable paddle-gate member and open top-end and bottom-end for respectively charging and discharging the material to be weighed, the chute comprising an upright left-panel and an upright right-panel having a fixed transverse distance therebetween, a planar upright door closure along the chute rear-end upper portion and having the door upper part pivotal about a horizontal transversely extending door-axis whereby the door pivotably swings rearwardly during paddle-gate revolvable ejection of a weighed batch, said upright door including a substantially horizontal transversely extending lower-edge, stabilization means for maintaining the door upright during charging of a material batch, and said chute further comprising a rearwardly flared trough spaced below the door lower-edge and converging toward the chute open bottom-end to direct a weighed batch downwardly-forwardly theretoward after having been ejected by the paddle-gate through the rearwardly swinging door;

B. A generally horizontal balancing bail including transversely separated side arms located externally along the left-panel and the right-panel and further including a horizontal intervening bight portion located externally of the chute rear-end, said bail side arms having intermediate portions pivotably attached along a transversely extending horizontal bail-axis to the chute left-panel and right-panel, and a weighing beam member extending rearwardly from the bail bight portion;

C. A paddle-gate member located within the chute having a transversely extending and vertically reciprocatable paddle-axis that is revolvable secured to the bail side arms forwardly of the bail-axis, said paddle-gate member having more than two spaced apart paddle members extending radially outwardly from the paddle-axis, each paddle having a pair of transversely separated exposed radial free-edges which are spaced a finite-gap inwardly away from the chute left-panel and right-panel; and D. Stop-means for the uprighted paddles and secured within said chute at a level above said vertically reciprocatable paddle-axle and spaced therefrom a distance approximately equivalent to the radial dimension of the respective paddles.

2. The weighing and measuring apparatus of claim 1 wherein the stabilization means for maintaining the door upright during charging of a material batch comprises a weighty door that tends to depend weightily downwardly from the door-axis together with at least one abutment means attached to and extending transversely outwardly of the door to forwardly abut upright rearward portions of the chute.

3. The weighing and measuring apparatus of claim 2 wherein the rearwardly flared trough is spaced below the bail horizontal bight portion; and wherein the weighing beam member includes a slidable weight therealong to determine the weight of each ejected and discharged batch.

4. The weighing and measuring apparatus of claim 3 wherein the stop-means is of the toggle type and secured inside said chute and comprising an elongate bar of adustable vertical height, there being a toggle pivotably attached to a frontal portion of the elongate bat to prevent forward revolving of the paddle-gate member during batch weighing.

5. A weighing and measuring apparatus especially adapted for heavy batches of agricultural crop such as fodder, silage, and other crops, and the apparatus comprising:

A. An upright chute having an open upright front-end to accommodate the radial panels of a revolvable paddle-gate member and open top-end and bottom-end for respectively charging and discharging the material to be weighed, the chute also comprising transversely separated left-panel and right-panel and also a closed rear-end;

B. A generally horizontal balancing bail including transversely separated side arms located externally along the left-panel and the right-panel and further including a horizontal intervening bight portion located externally of the chute rear-end, said bail side arms having intermediate portions pivotably attached along a transversely extending horizontal bail-axis to the chute left-panel and right-panel, and a weighing beam member extending rearwardly from the bail bight portion;

C. A paddle-gate member located within the chute having a transversely extending and vertically reciprocatable paddle-axle that is revolvably secured to the bail arms forwardly of the bail-axis, said paddle-gate member having more than two spaced apart paddle members extending radially outwardly of transverse paddle-axis; and D. At least one stop-means for the successively uprighted paddles and located within said chute at a level above said vertically reciprocatable paddle-axle and spaced upwardly therefrom a distance approximately equivalent to the radial dimension of the respective paddles, the stop-means comprising an elongate bar of vertically adjustable height and having fore-end, which bar fore-end is adapted to abut a paddle remote-end to prevent paddle-gate rearward turning at its material charging upward-station but not at the fully charged downward-station thereof, a toggle upwardly pivotably associated with the bar forward portion to admit the paddle transverse remote-end between it and the bar fore-end and having a normal-station depending of the bar to stationarily confine the paddle and the entire paddle-gate member from revolving forwardly during chargeable weighing of a material batch.

6. The weighing and measuring apparatus of claim 5 wherein the elongate bar of the stop-means including the associated toggle is of adjustable vertical height to compensate for misalignment of the revolvable paddle-gate member.

7. The weighing and measuring apparatus of claim 6 wherein the stop-means elongate bar is substantially horizontal and parallel to the chute left-panel, a medial part of the elongate bar being pivotably attached to the chute left-panel, spring means suspendably attaching the elongate bar rear-end to the chute left-panel, and gradual pressure-application means extending downwardly from the chute left-panel to the stop-means bar between its pivotal and spring connections to the left-panel to stably adjust the vertical height of the stop-means.

8. The weighing and measuring apparatus of claim 6 wherein there is an upright door closure along the chute rear-end upper portion and having the door upper part pivotal about a horizontal transversely extending door-axis whereby the door pivotably swings rearwardly during paddle-gate revolvable ejection of a fully charged batch, said upright rear door including a substantially horizontal transversely extending lower-edge, stabilization means for maintaining the door upright during material charging onto the stationary paddle-gate member, and said chute further comprising a rearwardly flared trough spaced below the door lower-edge and converging toward the chute open bottom-end to direct a fully weighed batch downwardly-forwardly theretoward after having been rearwardly revolvably ejected by the fully charged paddle-gate member and at least partially through the rearwardly swing-able door.

9. The weighing and measuring apparatus of claim 7 wherein the chute volume exceeds about 25,000 cubic inches; and wherein there is another said elongate bar and toggle type stop-means and positioned at the chute right-panel and at co-elevation with said left-panel stop-means.

10. The weighing and measuring apparatus of claim 9 wherein the rear door stabilization means comprises a weighty door, there being at least one abutment ear attached to and extending transversely outwardly of the door to forwardly abut upright rearward portions of the chute; wherein the chute volume exceeds about 25,000 cubic inches; and wherein there is a pair of said elongate bar and toggle-type stop-means respectively positioned at the chute left-panel and right-panel.

* * * * *